(12) United States Patent
Fumanal et al.

(10) Patent No.: US 11,713,829 B2
(45) Date of Patent: Aug. 1, 2023

(54) DEVICE FOR SHUTTING OFF A PIPE (71) Applicant: ONIS, Lambesc (FR)

(72) Inventors: Yann Fumanal, Pelissanne (FR); Adrien Flumiani, Coudoux (FR)

(73) Assignee: ONIS, Lambesc (FR)

( * ) Notice: Subject to any disclaimer, the term of this patent is extended or adjusted under 35 U.S.C. 154(b) by 73 days.

(21) Appl. No.: 17/423,536

(22) PCT Filed: May 4, 2020

(86) PCT No.: PCT/EP2020/062333
§ 371 (c)(1),
(2) Date: Jul. 16, 2021

(87) PCT Pub. No.: WO2020/233973
PCT Pub. Date: Nov. 26, 2020

(65) Prior Publication Data
US 2022/0074516 A1    Mar. 10, 2022

(30) Foreign Application Priority Data

May 17, 2019 (FR) ........................................ 1905200

(51) Int. Cl.
*F16K 35/14* (2006.01)
(52) U.S. Cl.
CPC .................... *F16K 35/14* (2013.01)
(58) Field of Classification Search
CPC . F16K 35/14; F16K 3/312; F16K 1/50; F16K 35/022; F16K 35/025; F16K 35/02; F16K 35/027

(Continued)

(56) References Cited

U.S. PATENT DOCUMENTS

| | | | | |
|---|---|---|---|---|
| 2,709,452 A | * | 5/1955 | Calabrese | ............... F16K 35/14 137/637.1 |
| 3,792,612 A | * | 2/1974 | Lammel | .................. G01N 1/04 251/114 |

(Continued)

FOREIGN PATENT DOCUMENTS

| | | |
|---|---|---|
| EP | 3 144 569 A1 | 3/2017 |
| GB | 772207 A | 4/1957 |

OTHER PUBLICATIONS

PCT International Search Report dated Jun. 4, 2020, Application No. PCT/EP2020/062333, Applicant ONIS, 11 Pages.

*Primary Examiner* — Craig J Price
*Assistant Examiner* — Andrew J Rost
(74) *Attorney, Agent, or Firm* — Brooks Kushman P.C.

(57) ABSTRACT

A device for shutting off a pipe, the pipe allowing fluidic circulation of at least one fluid, the shut-off device having an in-line shut-off means for shutting off the pipe in a sealed manner and, conversely, for opening the pipe, an upstream valve arranged upstream of the in-line shut-off means, and a downstream valve arranged downstream of the in-line shut-off means. The shut-off device has an interlocking system for interlocking a member for tightly closing the in-line shut-off means with, for the one part, an upstream control member of the upstream valve and, for the other part, a downstream control member of the downstream valve, the interlocking system being movable in translation in a direction OX between a first end position and a second end position, the interlocking system having at least three separate parts assembled together.

10 Claims, 4 Drawing Sheets

(58) Field of Classification Search
USPC .............. 137/613–614, 614.06; 251/89–116
See application file for complete search history.

(56) References Cited

U.S. PATENT DOCUMENTS

| | | | | |
|---|---|---|---|---|
| 4,429,711 A | * | 2/1984 | Schomer | ................. F16K 35/14 |
| | | | | 137/637.1 |
| 7,117,884 B2 | * | 10/2006 | Shuter | ................... F16K 35/022 |
| | | | | 251/95 |
| 10,330,206 B2 | | 6/2019 | Rivas | |

* cited by examiner

DEVICE FOR SHUTTING OFF A PIPE

CROSS REFERENCE TO RELATED APPLICATIONS

This application is the U.S. national phase of PCT Application No. PCT/EP2020/062333 filed on May 4, 2020, which claims priority to French Patent Application No. FR 19 05200 filed on May 17, 2019, which are incorporated herein by reference in their entireties.

TECHNICAL FIELD

The present invention relates to a shut-off device intended to be attached to a pipe in order to shut it off in a sealed manner or allow fluidic circulation of a fluid.

The invention relates to the general technical field of valves associated upstream and downstream with an in-line shut-off means on a pipe. Such an in-line shut-off means differs from conventional valves in that it comprises a plate that is able to move in a plane perpendicular to the pipe and tightening (and spacing) means allowing the movable plate to be tightened in (or released from) a shut-off position and alternatively a fluid circulation position.

The invention is particularly applicable in chemical or petrochemical facilities in which a completely tight seal is required when shutting off a pipe.

BACKGROUND

Moreover, known shut-off devices may comprise an interlocking plate for interlocking a tightening control member for controlling the means for tightening the in-line shut-off means with an upstream control member of an upstream valve and a downstream control member of a downstream valve.

However, such an interlocking plate is complex to manufacture. Indeed, portions of the interlocking plate need to be able to cooperate precisely with the different control members of the shut-off device.

Furthermore, each interlocking plate is dedicated to a single combination of an upstream valve, a downstream valve and an in-line shut-off means. Therefore, in the event of a failure of one of these components, the interlocking plate requires the faulty member to be replaced with exactly the same member produced by the same supplier.

SUMMARY

The object of the present invention is therefore to propose a shut-off device that is simpler to manufacture and that is modular in order to facilitate the replacement of a faulty member, and in particular an upstream or downstream valve, of the shut-off device.

The invention therefore relates to a device for shutting off a pipe allowing fluidic circulation of at least one fluid, the shut-off device comprising:

an in-line shut-off means for shutting off the pipe in a sealed manner and, conversely, for opening the pipe, the in-line shut-off means comprising a plate and tightening means allowing the plate to be tightened and, conversely, released, in order to allow the plate to be moved relative to the pipe, the plate being able to be moved depending on the positioning of a tightening control member;

an upstream valve arranged upstream of the in-line shut-off means, the upstream valve being able to be actuated between an open position allowing fluidic circulation and a closed position preventing fluidic circulation, the upstream valve being actuated manually by an operator by means of an upstream control member; and a downstream valve arranged downstream of the in-line shut-off means, the downstream valve being able to be actuated between an open position allowing fluidic circulation and a closed position preventing fluidic circulation, the downstream valve being actuated manually by an operator by means of a downstream control member.

According to the invention, such a shut-off device is remarkable in that it comprises an interlocking system for interlocking the tightening control member with the upstream control member and the downstream control member, the interlocking system being movable in translation in a direction OX between a first end position and a second end position, the interlocking system comprising different portions such that:

in the first end position, a first portion allows the manual actuation of the upstream control member, a second portion allows the manual actuation of the downstream control member and a third portion prevents the manual actuation of the tightening control member; and in the second end position, a fourth portion prevents the manual actuation of the upstream control member, a fifth portion prevents the manual actuation of the downstream control member and a sixth portion allows the manual actuation of the tightening control member.

Moreover, such an interlocking system comprises at least three separate parts assembled together, the at least three parts comprising a first part comprising the first portion and the fourth portion, a second part comprising the third portion and the sixth portion and a third part comprising the second portion and the fifth portion.

In other words, such a three-part assembly of the interlocking system allows dimensional constraints linked to the manufacture of the interlocking system to be eliminated. Additionally, each of the first, second and third parts may have different dimensions in order, for example, to adapt to several different models of upstream valves, downstream valves or in-line shut-off means.

Moreover, the three parts constituting the interlocking system may be assembled together interchangeably. According to a first embodiment, the first part and the third part may be attached to a second part that is longer than the two other parts.

According to a second embodiment, the first part and the second part may also be attached to a third part that is longer than the two other parts.

According to a third embodiment, the first part may be attached to the second part, the second part being attached to the third part. In this case, the three parts may be of substantially equal lengths.

Thus, when an upstream valve, a downstream valve or an in-line shut-off means needs to be replaced, only a corresponding part of the interlocking system may be replaced or moved relative to the other parts of the interlocking system.

Furthermore, the upstream and downstream valves of such a shut-off device may be chosen from the group comprising ball valves, butterfly valves, membrane valves, knife gate valves, mushroom valves and piston valves. When one of these upstream or downstream valves is faulty, this faulty valve may then be replaced with another model of valve or by an equivalent model but from another supplier.

Moreover, different examples of in-line shut-off means that may equip such a shut-off device have been described, in particular, by the applicant, in document EP3144569. Such examples of in-line shut-off means therefore all comprise tightening means for tightening or releasing a movable shut-off plate and then allow this movable plate to be moved relative to the pipe.

Advantageously, the interlocking system may comprise reversible securing means allowing the at least three parts to be secured together.

In other words, once the three parts of the interlocking system are assembled together by the reversible securing means, it is possible to separate them subsequently, if necessary, for example in order to replace one of the parts or indeed to modify its positioning relative to at least one of the two other parts.

Such reversible securing means may, in particular, be in the form of screws, nuts, pins, elastic rings or snap-fit fasteners, for example, or any equivalent fastening device.

In practice, the interlocking system may comprise longitudinal adjustment means allowing relative positions of the at least three parts to be modified in the direction OX.

Therefore, the longitudinal adjustment means allow the parts of the interlocking system to be guided longitudinally relative to one another in a straight line in the direction OX. Once the relative positions have been chosen, the reversible securing means may then, for example, be tightened in order to immobilise the parts in relation to one other.

Therefore, for example, when an upstream valve or a downstream valve is replaced with another valve having different dimensional characteristics in the direction OX, the longitudinal adjustment means allow the positioning of the part of the interlocking system arranged opposite the replaced valve to be modified in relation to at least one of the two other parts.

According to an advantageous example of the invention, the longitudinal adjustment means may comprise oblong holes provided in at least one of the at least three parts.

Indeed, at least two oblong holes may then cooperate with screws forming the reversible securing means and provide guidance in translation in the direction OX. The direction of the oblong holes is therefore arranged parallel to the direction OX in order to enable such a longitudinal adjustment between the three parts of the interlocking system.

Advantageously, the first portion may comprise a first at least partially circular cutout allowing a rotational movement of a first shaft integral in rotation with the upstream control member, the first shaft comprising a first partially circular cam, the first cam comprising a first cylindrical wall cooperating with the first at least partially circular cutout.

Indeed, when the upstream valve comprises an upstream control member that is able to rotate in relation to a body of the upstream valve, such a first at least partially circular cutout allows the first cylindrical wall of the first cam to rotate freely.

In this case, the fourth portion may comprise at least one first straight edge configured to prevent the rotational movement of the first shaft integral in rotation with the upstream control member, the first cam comprising a first plane cooperating with the first straight edge.

The upstream valve comprising a control member that is able to rotate in relation to a body of the upstream valve, such a first straight edge prevents the first cylindrical wall of the first cam from rotating by coming into contact with the first plane.

In practice, the second portion may comprise a second at least partially circular cutout allowing a rotational movement of a second shaft integral in rotation with the downstream control member, the second shaft comprising a second partially circular cam, the second cam comprising a second cylindrical wall cooperating with the second at least partially circular cutout.

Indeed, when the downstream valve comprises a downstream control member that is able to rotate in relation to a body of the downstream valve, such a second at least partially circular cutout allows the second cylindrical wall of the second cam to rotate freely.

Moreover, the fifth portion may comprise at least one second straight edge configured to prevent the rotational movement of the second shaft integral in rotation with the downstream control member, the second cam comprising a second plane cooperating with the second straight edge.

Thus, the downstream valve comprising a control member that is able to rotate in relation to a body of the downstream valve, such a second straight edge prevents the second cylindrical wall of the second cam from rotating by coming into contact with the second plane.

According to an advantageous example of the invention, the third portion may comprise at least one third straight edge configured to prevent the rotational movement of a third shaft integral in rotation with the tightening control member, the third shaft comprising a third partially circular cam, the third cam comprising a third plane cooperating with the third straight edge.

By way of analogy, when the in-line shut-off means comprises a tightening control member that is able to rotate in relation to a body of the in-line shut-off means, such a third straight edge prevents the third cam from rotating.

Moreover, the sixth portion may comprise a third at least partially circular cutout allowing a rotational movement of the third shaft integral in rotation with the tightening control member, the third cam comprising a third cylindrical wall cooperating with the third at least partially circular cutout.

Indeed, when the in-line shut-off means comprises a tightening control member that is able to rotate in relation to a body of the in-line shut-off means, such a third at least partially circular cutout allows the third cylindrical wall of the third cam to rotate freely.

BRIEF DESCRIPTION OF THE DRAWINGS

The invention and its advantages appear in greater detail from the following description of examples given by way of illustration with reference to the accompanying figures, in which.

DETAILED DESCRIPTION

Elements present in more than one of the figures may be given the same references in each of them.

As already indicated, the invention relates to the technical field of devices for shutting off a pipe.

Figure 1:
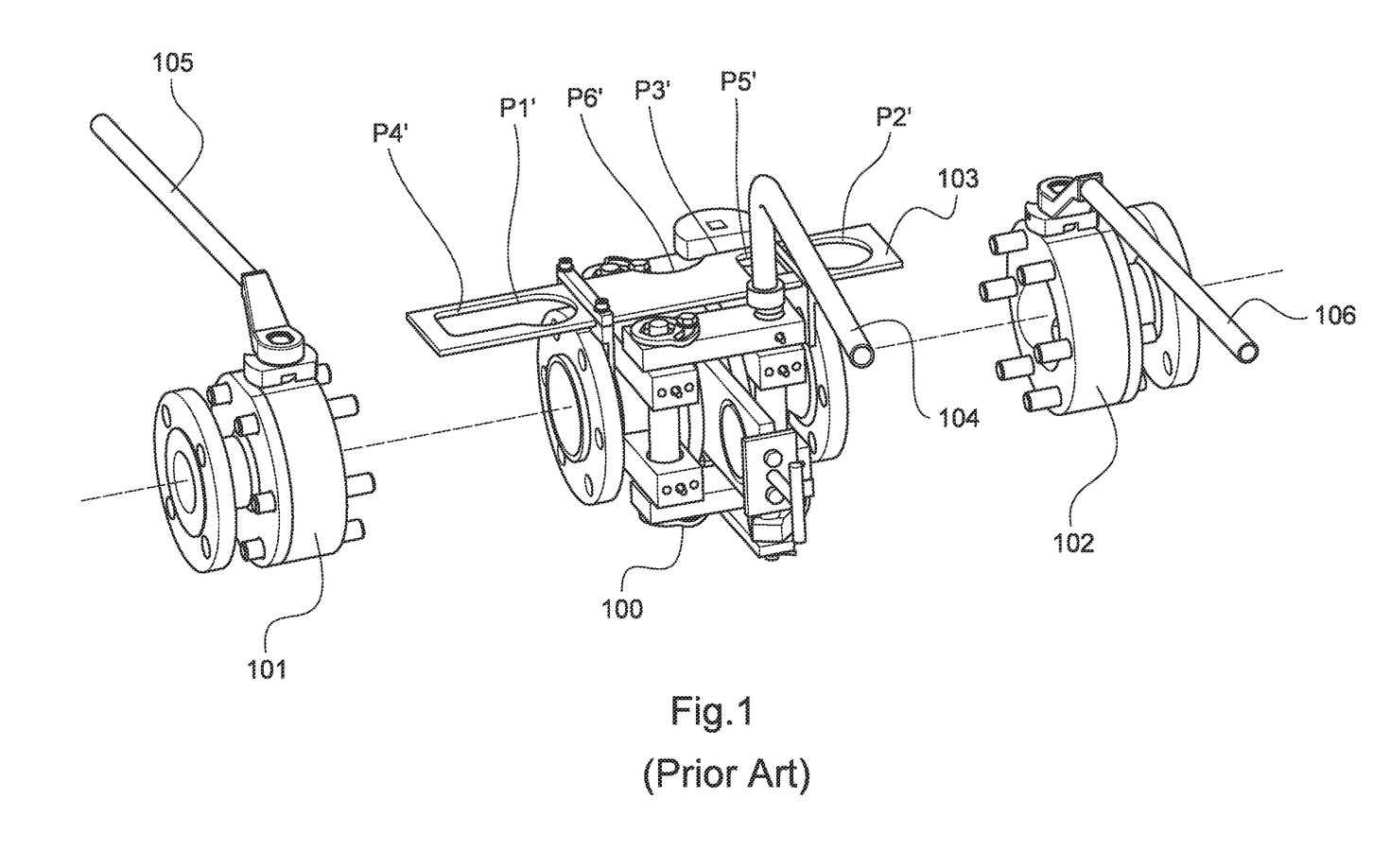
FIG. 1 is a perspective view of a shut-off device according to the prior art.

According to the prior art, and as shown in FIG. 1, such shut-off devices comprise an in-line shut-off means 100 for shutting off a pipe in a sealed manner and, conversely, for opening a pipe. Such an in-line shut-off means 100 is moreover arranged between an upstream valve 101 and a downstream valve 102.

An interlocking plate 103 is also fitted in order to allow a tightening member 104 to be interlocked with an upstream control member 105 and a downstream control member 106.

Indeed, the upstream valve 101 may be actuated manually by an operator by means of the upstream control member 105 whereas the downstream valve 102 may be actuated manually by an operator by means of the downstream control member 106.

Furthermore, the interlocking plate 103 is able to move between two end positions.

In a first end position of the interlocking plate 103, a first portion p1' allows the manual actuation of the upstream control member 105, a second portion p2' allows the manual actuation of the downstream control member 106 and a third portion p3' prevents the manual actuation of the tightening control member 104.

However, in the second end position of the interlocking plate 103, a fourth portion p4' prevents the manual actuation of the upstream control member 105, a fifth portion p5' prevents the manual actuation of the downstream control member 106 and a sixth portion p6' allows the manual actuation of the tightening control member 104.

However, such shut-off devices are not designed to allow the replacement of a faulty valve or in-line shut-off means. It is either necessary to replace the faulty valve or in-line shut-off means with exactly the same model of valve or in-line shut-off means, or also replace the interlocking plate in order to adapt it to the new dimensions of the replaced valve or in-line shut-off means.

Figure 2:
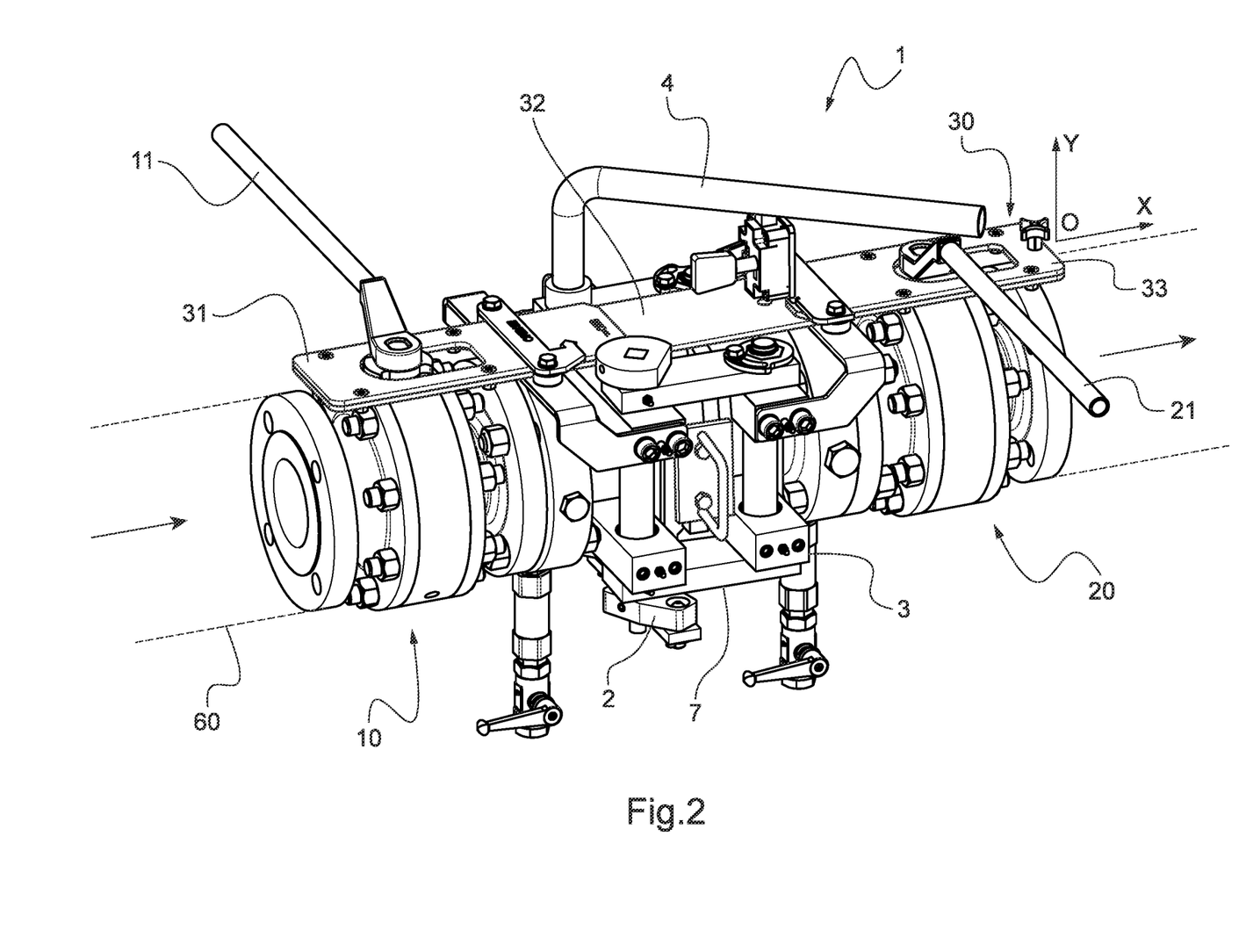
FIG. 2 is a perspective view of a shut-off device according to the invention.

As shown in FIG. 2, the device 1 for shutting off a pipe 60 therefore comprises an in-line shut-off means 3 for shutting off the pipe in a sealed manner and, conversely, for opening the pipe 60. Furthermore, such an in-line shut-off means 3 comprises a plate 7 and tightening means 2 allowing the plate 7 to be tightened and, conversely, released, in order to allow the plate 7 to be moved relative to the pipe 60.

Such a plate 7 comprises an empty portion allowing the circulation of the fluid and a solid portion for shutting off the pipe 60. This plate 7 is thus able to move in relation to the pipe between two end positions and may be moved depending on the positioning of a tightening control member 4.

Moreover, the shut-off device 1 also comprises an upstream valve 10 arranged upstream of the in-line shut-off means 3 and a downstream valve 20 arranged downstream of the in-line shut-off means 3.

The upstream valve 10 may be actuated between an open position allowing fluidic circulation and a closed position preventing fluidic circulation. This upstream valve 10 is actuated manually by an operator by means of an upstream control member 11.

Similarly, the downstream valve 20 may be actuated between an open position allowing fluidic circulation and a closed position preventing fluidic circulation. Such a downstream valve 20 is actuated manually by an operator by means of a downstream control member 21.

According to the invention, such a shut-off device 1 comprises an interlocking system 30 for interlocking the tightening control member 4 with the upstream control member 11 and the downstream control member 21. Such an interlocking system 30 is moreover movable in translation in a direction OX between a first end position and a second end position.

Figure 3:
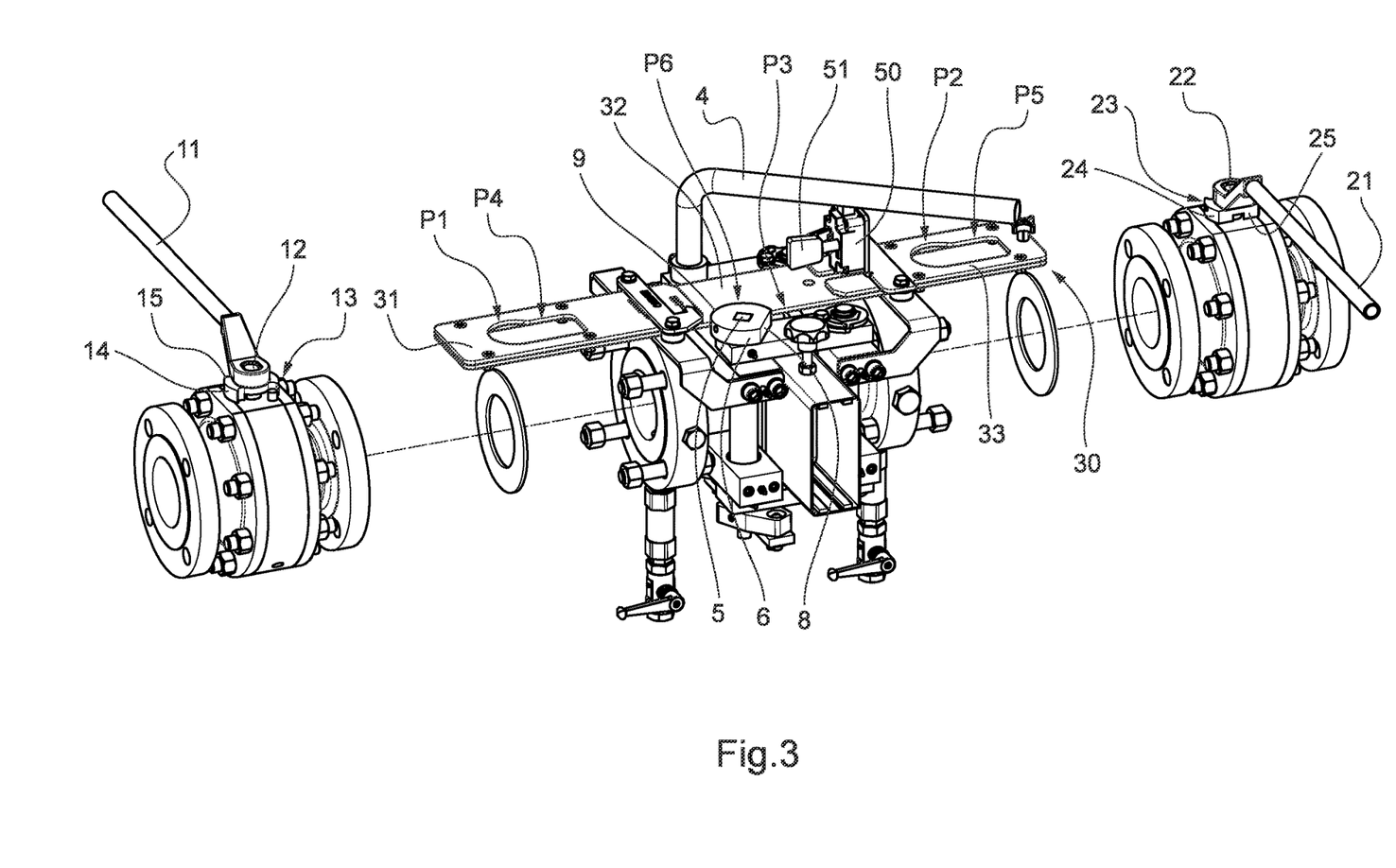
FIG. 3 is an exploded perspective view of a shut-off device according to the invention.

As shown in FIG. 3, such an interlocking system 30 comprises different portions p1-p6.

Therefore, in the first end position of the interlocking system 30, a first portion p1 allows the manual actuation of the upstream control member 11, a second portion p2 allows the manual actuation of the downstream control member 21 and a third portion p3 prevents the manual actuation of the tightening control member 4.

However, in the second end position, a fourth portion p4 prevents the manual actuation of the upstream control member 11, a fifth portion p5 prevents the manual actuation of the downstream control member 21 and a sixth portion p6 allows the manual actuation of the tightening control member 4.

Moreover, the interlocking system 30 comprises at least three separate parts 31, 32, 33 assembled together, the three parts 31, 32, 33 comprising a first part 31 comprising the first portion p1 and the fourth portion p4, a second part 32 comprising the third portion p3 and the sixth portion p6 and a third part 33 comprising the second portion p2 and the fifth portion p5.

Figure 4:
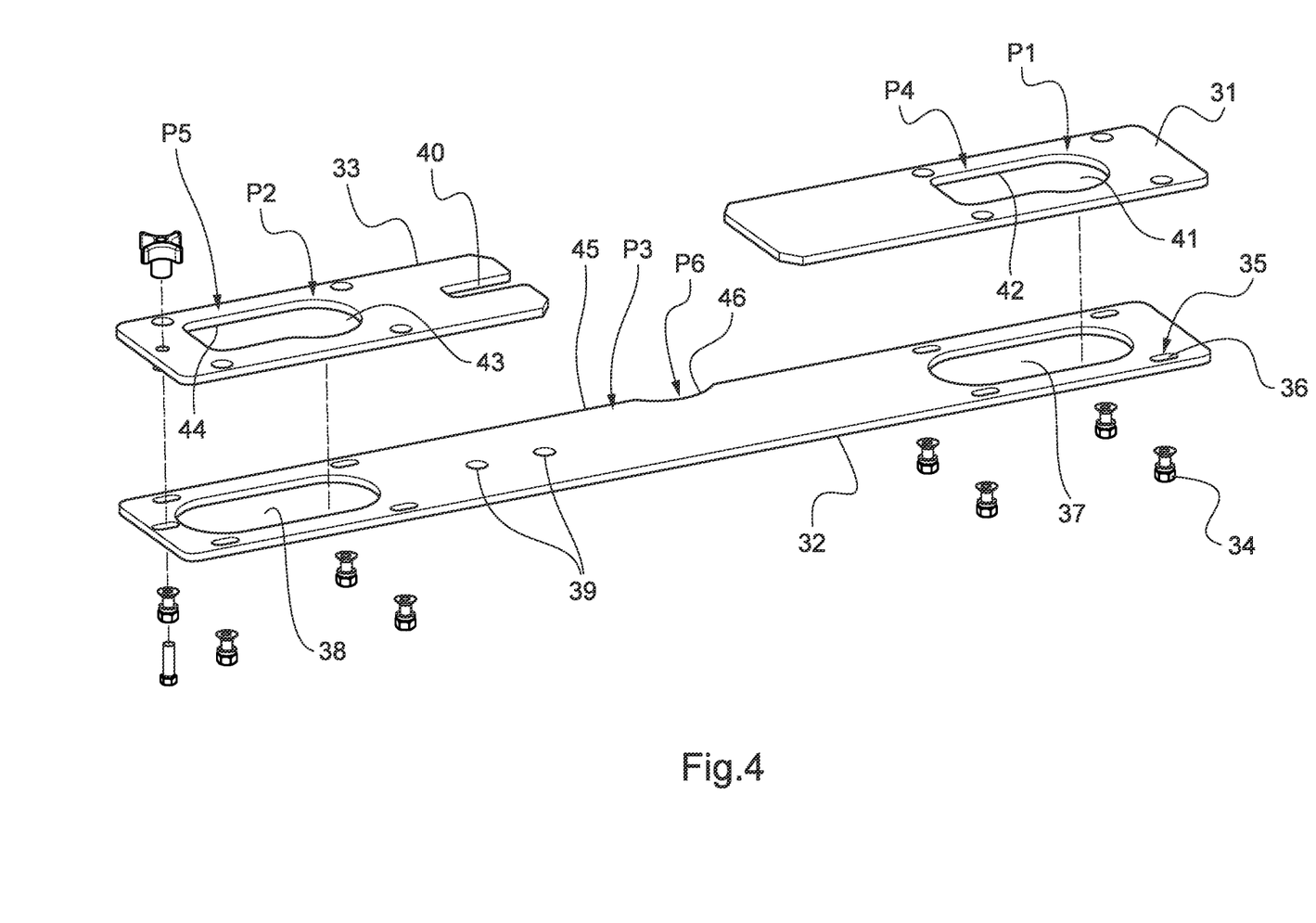
FIG. 4 is an exploded perspective view of an interlocking system, according to the invention.

As shown in FIG. 4, the first portion p1 may comprise a first at least partially circular cutout 41 allowing a rotational movement of a first shaft 12 integral in rotation with the upstream control member 11. Moreover, the first shaft 12 may comprise a first partially circular cam 13, this first cam 13 then comprising a first cylindrical wall 14 cooperating with the first at least partially circular cutout 41.

Moreover, the fourth portion p4 may comprise at least one first straight edge 42 configured to prevent the rotational movement of the first shaft 12 integral in rotation with the upstream control member 11. Thus, the first cam 13 may comprise a first plane 15 cooperating with the first straight edge 42.

By way of analogy, the second portion p2 may comprise a second at least partially circular cutout 43 allowing a rotational movement of a second shaft 22 integral in rotation with the downstream control member 21. This second shaft 22 may comprise a second partially circular cam 23, this second cam 23 comprising a second cylindrical wall 24 cooperating with the second at least partially circular cutout 43.

Similarly, the fifth portion p5 may comprise at least one second straight edge 44 configured to prevent the rotational movement of the second shaft 22 integral in rotation with the downstream control member 21. This second cam 23 may comprise a second plane 25 cooperating with the second straight edge 44.

Furthermore, the third portion p3 may comprise at least one third straight edge 45 configured to prevent the rotational movement of a third shaft 5 integral in rotation with the tightening control member 4. This third shaft 5 may thus comprise a third partially circular cam 6, this third cam 6 comprising a third plane 8 cooperating with the third straight edge 45.

Finally, the sixth portion p6 may comprise a third at least partially circular cutout 46 allowing a rotational movement of the third shaft 5 integral in rotation with the tightening control member 4. Thus, this third cam 6 may comprise a third cylindrical wall 9 cooperating with said third at least partially circular cutout 46.

Moreover, the interlocking system 30 may comprise reversible securing means 34 allowing the three parts 31, 32, 33 to be secured together.

These reversible securing means 34 are shown in the form of bolts comprising screws each cooperating respectively with one nut.

Moreover, the interlocking system 30 may also comprise longitudinal adjustment means 35 allowing relative positions of the three parts 31, 32, 33 to be modified in the direction OX.

Furthermore, such longitudinal adjustment means 35 may, for example, be formed by at least two oblong holes 36 extending in a direction parallel to the direction OX. As shown, eight holes 36 are provided in the second part 32 of the interlocking system 30 and allow the first part 31 and the third part 33 to move in translation in relation to the second part 32.

Moreover, such a shut-off device 1 may also comprise an indexing finger 50 mounted on a body of the in-line shut-off means 3. Such an indexing finger 50 then comprises a movable end that is able to move between a deployed position and a stowed position. This end is moved in translation in a direction OY perpendicular to the direction OX. The translational movement of the end of the indexing finger 50 can also be effected under the control of a key 51 operated manually by an operator.

The movable end of the indexing finger 50 is configured to cooperate with two complementary holes 39, for example provided in the second part 32 of the interlocking system 30 in order to index the interlocking system 30 in position in relation to the body of the in-line shut-off means 3.

Moreover, a slit 40 may be provided in the third part 33 in order to provide a passage through which the movable end of the indexing finger 50 can pass freely.

Furthermore, two holes 37 and 38 may also be provided in the second part 32 of the interlocking system 30 in order to allow the first cam 13 and the second cam 23 to pass through freely when the interlocking system 30 is moved in the direction OX.

Naturally, the present invention is subject to numerous variations as regards its implementation. Although several implementations are described above, it should readily be understood that an exhaustive identification of all possible embodiments is not conceivable. It is naturally possible to replace any of the means described with equivalent means without going beyond the ambit of the present invention.

What is claimed is:

1. A device for shutting off a pipe, the pipe allowing fluidic circulation of at least one fluid, the shut-off device comprising:
    an in-line shut-off means for shutting off the pipe in a sealed manner and, conversely, for opening the pipe, the in-line shut-off means comprising a plate and tightening means allowing the plate to be tightened and, conversely, released, in order to allow the plate to be moved relative to the pipe, the plate being able to be moved depending on the positioning of a tightening control member;
    an upstream valve arranged upstream of the in-line shut-off means, the upstream valve being able to be actuated between an open position allowing the fluidic circulation and a closed position preventing the fluidic circulation, the upstream valve being actuated manually by an operator by means of an upstream control member; and
    a downstream valve arranged downstream of the in-line shut-off means, the downstream valve being able to be actuated between an open position allowing the fluidic circulation and a closed position preventing the fluidic circulation, the downstream valve being actuated manually by an operator by means of a downstream control member,
    wherein the shut-off device comprises an interlocking system for interlocking the tightening control member with the upstream control member and the downstream control member, the interlocking system being movable in translation in a direction OX between a first end position and a second end position, the interlocking system comprising different portions such that:
        in the first end position, a first portion allows the manual actuation of the upstream control member, a second portion allows the manual actuation of the downstream control member and a third portion prevents the manual actuation of the tightening control member; and
        in the second end position, a fourth portion prevents the manual actuation of the upstream control member, a fifth portion prevents the manual actuation of the downstream control member and a sixth portion allows the manual actuation of the tightening control member,
    the interlocking system comprising at least three separate parts assembled together, the at least three parts comprising a first part comprising the first portion and the fourth portion, a second part comprising the third portion and the sixth portion and a third part comprising the second portion and the fifth portion.

2. The shut-off device according to claim 1, wherein the interlocking system comprises reversible securing means allowing the at least three parts to be secured together.

3. The shut-off device according to claim 1, wherein the interlocking system comprises longitudinal adjustment means allowing relative positions of the at least three parts to be modified in the direction OX.

4. The shut-off device according to claim 3, wherein the longitudinal adjustment means comprise oblong holes provided in at least one of the at least three parts.

5. The shut-off device according to claim 1, wherein the first portion comprises a first at least partially circular cutout allowing a rotational movement of a first shaft integral in rotation with the upstream control member, the first shaft comprising a first partially circular cam, the first cam comprising a first cylindrical wall cooperating with the first at least partially circular cutout.

6. The shut-off device according to claim 5, wherein the fourth portion comprises at least one first straight edge configured to prevent the rotational movement of the first shaft integral in rotation with the upstream control member, the first cam comprising a first plane cooperating with the first straight edge.

7. The shut-off device according to claim 1, wherein the second portion comprises a second at least partially circular cutout allowing a rotational movement of a second shaft integral in rotation with the downstream control member, the second shaft comprising a second partially circular cam, the second cam comprising a second cylindrical wall cooperating with the second at least partially circular cutout.

8. The shut-off device according to claim 7, wherein the fifth portion comprises at least one second straight edge configured to prevent the rotational movement of the second shaft integral in rotation with the downstream control member, the second cam comprising a second plane cooperating with the second straight edge.

9. The shut-off device according to claim 1, wherein the third portion comprises at least one third straight edge configured to prevent the rotational movement of a third shaft integral in rotation with the tightening control member, the third shaft comprising a third partially circular cam, the third cam comprising a third plane cooperating with the third straight edge.

10. The shut-off device according to claim 9, wherein the sixth portion comprises a third at least partially circular cutout allowing a rotational movement of the third shaft integral in rotation with the tightening control member, the third cam comprising a third cylindrical wall cooperating with the third at least partially circular cutout.

* * * * *